(12) United States Patent
Osato et al.

(10) Patent No.: US 7,104,597 B2
(45) Date of Patent: Sep. 12, 2006

(54) VEHICLE FRAME STRUCTURE

(75) Inventors: Hiroshi Osato, Wako (JP); Yasuhisa Egawa, Wako (JP); Yoshimine Katou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 11/050,539

(22) Filed: Feb. 3, 2005

(65) Prior Publication Data
US 2005/0194817 A1 Sep. 8, 2005

(30) Foreign Application Priority Data
Feb. 4, 2004 (JP) ............................. 2004-028485

(51) Int. Cl.
*B60J 7/00* (2006.01)
(52) U.S. Cl. ............. 296/203.04; 296/204; 296/204.03
(58) Field of Classification Search .......... 296/203.04, 296/204, 203.01, 30
See application file for complete search history.

(56) References Cited

U.S. PATENT DOCUMENTS

| | | | |
|---|---|---|---|
| 4,653,796 A * | 3/1987 | Koenig et al. ............... | 296/204 |
| 4,697,844 A * | 10/1987 | Giles ........................... | 296/25 |
| 4,708,391 A * | 11/1987 | Nakano ....................... | 296/204 |
| 4,726,166 A * | 2/1988 | DeRees ........................ | 52/694 |
| 4,848,835 A * | 7/1989 | DeRees ........................ | 296/204 |
| 4,909,565 A * | 3/1990 | Harasaki et al. ........ | 296/187.09 |
| 5,210,921 A * | 5/1993 | Booher ....................... | 29/401.1 |
| 5,370,438 A * | 12/1994 | Mori et al. ............. | 296/203.02 |
| 5,829,824 A * | 11/1998 | Yamamuro et al. ......... | 296/204 |
| 6,322,134 B1 * | 11/2001 | Yang ..................... | 296/203.02 |
| 6,416,117 B1 * | 7/2002 | Weiman ................. | 296/203.03 |
| 6,592,175 B1 * | 7/2003 | Shibata .................. | 296/203.02 |
| 6,595,581 B1 * | 7/2003 | Wolkersdorfer et al. .... | 296/204 |
| 6,733,040 B1 * | 5/2004 | Simboli ................. | 296/187.02 |
| 6,908,146 B1 * | 6/2005 | Tomita ................... | 296/203.02 |
| 6,976,731 B1 * | 12/2005 | Shibata et al. ......... | 296/203.03 |

FOREIGN PATENT DOCUMENTS

JP         2003-231483         8/2003

* cited by examiner

*Primary Examiner*—Kiran B. Patel
(74) *Attorney, Agent, or Firm*—Rankin, Hill, Porter & Clark LLP

(57) ABSTRACT

In a vehicle frame structure, an upper edge of a frame member is fixed to a lower face of a substantially flat panel, and a bottom wall of an upper stiffener fixed to an inner face of an upper part of a curved portion of the frame member and a bottom wall of a lower stiffener fixed to an outer face of a lower part of a region between two inflection points of the curved portion are arranged in an X shape relative to a top point of the curved portion. Therefore, when a compressive load in the longitudinal direction acts on the frame member, the curved portion of the frame member is effectively prevented from bending by counterbalancing the upward load acting on the lower stiffener bottom wall with the downward load acting on the upper stiffener bottom wall. Moreover, the upper stiffener and the lower stiffener are U-shaped cross-section members that can be formed by bent sheet metal, and thereby minimize any increase in weight due to installation of the stiffeners.

17 Claims, 4 Drawing Sheets

VEHICLE FRAME STRUCTURE

RELATED APPLICATION DATA

The Japanese priority application No. 2004-28485 upon which the present application is based is hereby incorporated in its entirety herein by reference.

BACKGROUND OF THE INVENTION

1. Field of the Invention

The present invention relates to a vehicle frame structure in which an upper edge of a frame member having an upwardly opening U-shaped cross-section is fixed to a lower face of a substantially flat panel so as to form a closed cross-section, and the frame member has a curved portion formed in a longitudinally middle section thereof, the curved portion having an upwardly curving bottom wall.

2. Description of the Related Art

If a longitudinal load due to a collision of an automobile is applied to a front side member having a closed cross-section that is bent in a crank shape when viewed from the side, there is a problem that a bending moment is generated in the bent portion (kick-up portion), thus causing a large degree of bending deformation. Japanese Patent Application Laid-open No. 2003-231483 discloses an arrangement in which the kick-up portion of the front side member is reinforced by a reinforcing member only on the compressive deformation side, thereby improving the rigidity of the kick-up portion while minimizing the increase in weight.

Also, a portion of an automobile rear frame mounting a rear wheel suspension system is curved upward into an arch shape in order to avoid interference with a suspension spring or a hydraulic damper, leading to another problem that a floor panel covering an upper face of the rear frame should also be curved upward, thus hindering effective utilization of the capacity within a vehicle compartment. If the upper face of the rear frame is made flat in order to make the floor panel flat, not only is the rigidity greatly degraded by an arch-shaped curved portion formed on a lower face of the rear frame, but also the curved portion is bent upward by the longitudinal load imposed on the rear frame when the automobile is involved in a collision, whereby it becomes difficult to exert an impact absorbing effect by making a front or rear portion of the rear frame effectively buckle.

In order to solve these problems, the arch-shaped curved portion formed in the rear frame is reinforced by a reinforcing member, thus making it difficult for the curved portion to be bent by the longitudinal load. However, unless the shape and arrangement of the reinforcing member are carefully determined, only the weight is increased without increase of the strength against the bending load.

SUMMARY OF THE INVENTION

The present invention has been achieved under the above-mentioned circumstances, and intends to improve bending strength of a U-shaped cross-section frame member having a flat upper edge and an upwardly curving bottom wall while minimizing increase in weight.

In order to attain this, there is provided a vehicle frame structure in which upper edges of a frame member having an upwardly opening U-shaped cross-section are fixed to a lower face of a substantially flat panel so as to form a closed cross-section, and the frame member has a curved portion formed in a longitudinally middle section thereof, the curved portion having an upwardly curving bottom wall, wherein an upwardly opening U-shaped cross-section upper stiffener is fixed to at least an inner face of an upper part of the curved portion of the frame member, wherein an upwardly opening U-shaped cross-section lower stiffener is fixed to an outer face of a lower part of a region between two inflection points of the bottom wall of the curved portion, and wherein a bottom wall of the upper stiffener and the bottom wall of the frame member are arranged in an X shape relative to a top point of the curved portion.

A floor panel 11 of an embodiment corresponds to the panel of the present invention, and a rear frame 12 of the embodiment corresponds to the frame member of the present invention.

In a preferred embodiment, since the upper edge of the upwardly opening U-shaped cross-section frame member is fixed to the lower face of the substantially flat panel so as to form the closed cross-section, and the curved portion whose bottom wall curves upward is formed in the longitudinally middle section of the frame member, it is possible to secure a large space above the flat-shaped panel while avoiding interference between a member disposed beneath the curved portion and the frame member. Furthermore, since the bottom wall of the upper stiffener fixed to the inner face of the upper part of the curved portion and the bottom wall of the lower stiffener fixed to the outer face of the lower part of the region between the two inflection points of the curved portion are arranged in the X shape relative to the top point of the curved portion, it is possible to effectively prevent the frame member from bending by counterbalancing an upward load acting on the bottom wall of the lower stiffener with a downward load acting on the bottom wall of the upper stiffener when a compressive load in the longitudinal direction acts on the frame member. Moreover, the upper stiffener and the lower stiffener are U-shaped cross-section members that can be formed by bending a metal sheet, thereby minimizing increase in weight due to installation thereof.

BRIEF DESCRIPTION OF THE DRAWINGS

Modes for carrying out the present invention will be explained below with reference to an embodiment of the present invention shown in the attached drawings.

FIG. 1 to FIG. 5 show one embodiment of the present invention, wherein:

FIG. 1 is a perspective view of a rear frame of an automobile,

FIG. 2 is a view from arrow 2 in FIG. 1,

FIG. 3 is an enlarged sectional view along line 3—3 in FIG. 2,

FIG. 4 is an enlarged sectional view along line 4—4 in FIG. 2, and

FIG. 5 is a view similar to FIG. 2 illustrating operation when the automobile is involved in a collision.

DETAILED DESCRIPTION OF THE PREFERRED EMBODIMENT

Figure 1:
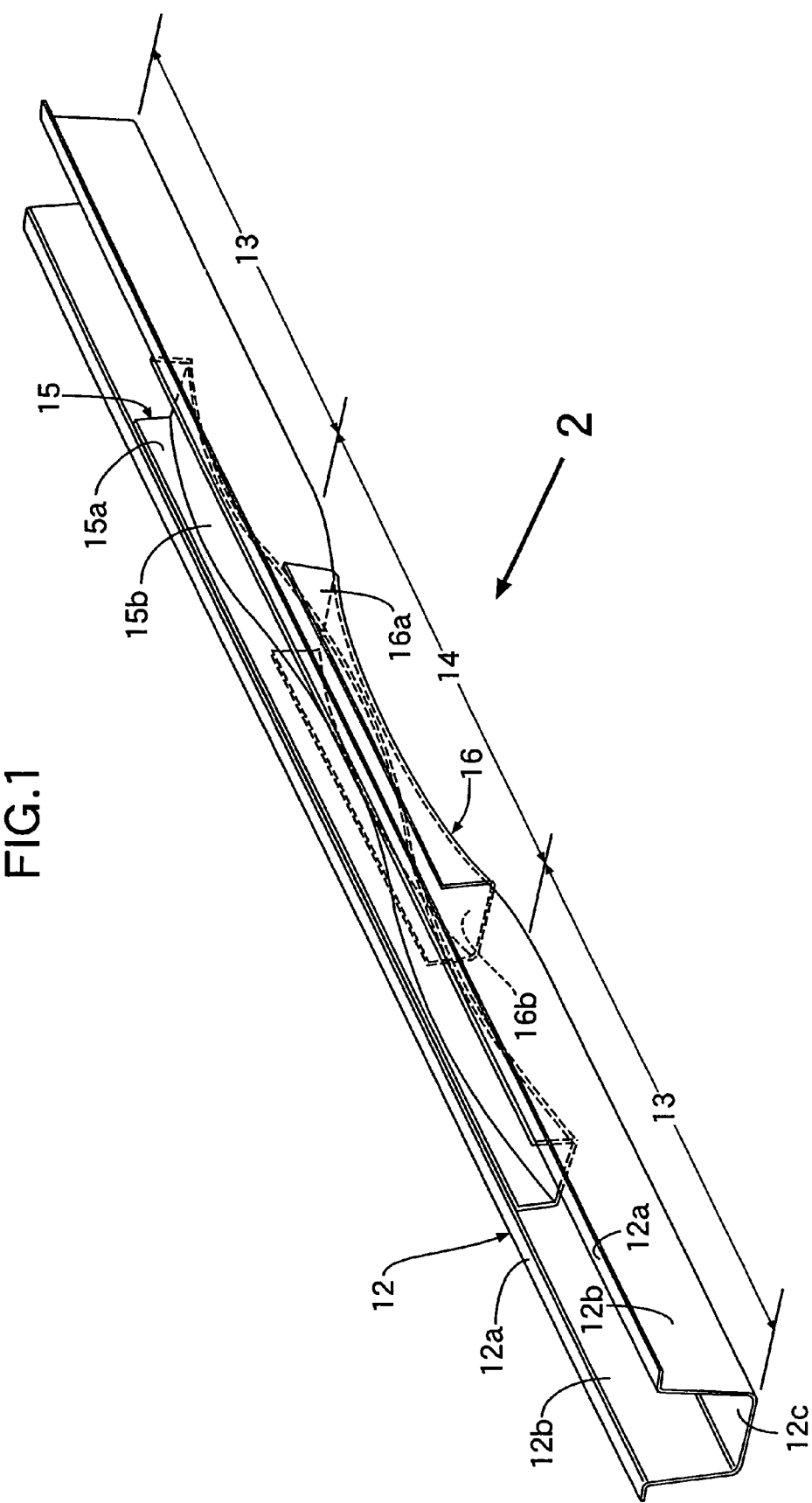
Figure 2:
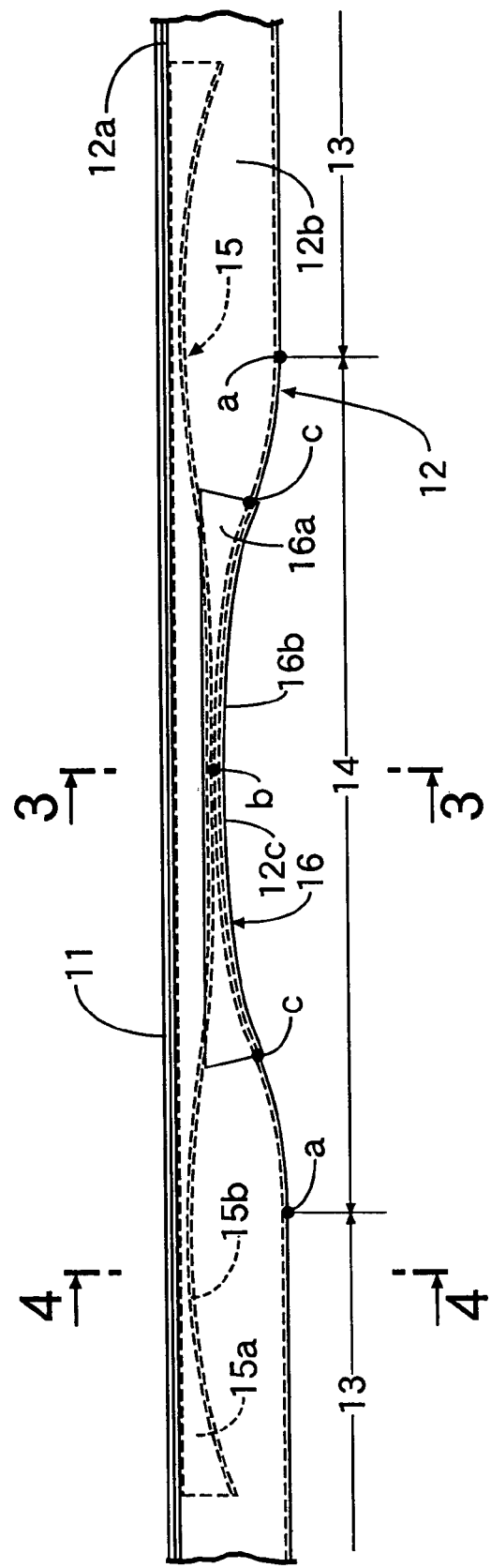
Figure 3:
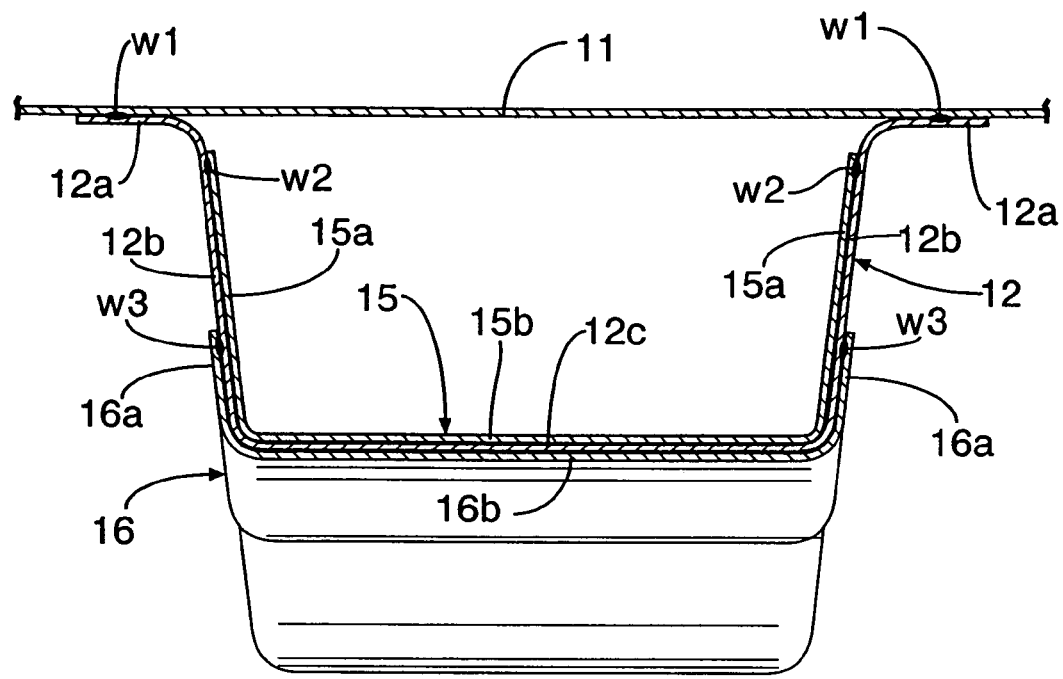
Figure 4:
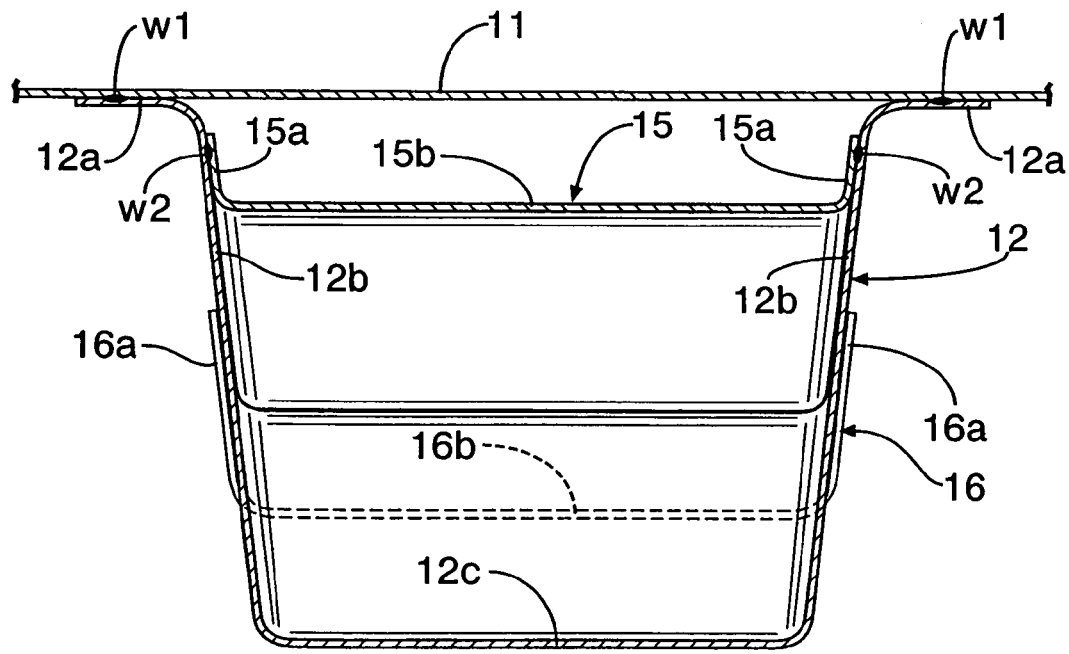

As shown in FIG. 1 to FIG. 4, a rear frame 12 extending in the longitudinal direction of a vehicle body is fixed to a lower face of a substantially flat floor panel 11 of an automobile. Since two rear frames 12 are arranged along opposite lateral sides of the floor panel 11, and they have a symmetrical shape relative to the center plane of the vehicle body, one of the rear frames 12 will be explained below.

The rear frame 12 is a member having a U-shaped cross section whose upper face is open. Flanges 12a formed by bending a pair of upper edges of the rear frame 12 are welded with a weld w1 to a lower face of the floor panel 11 so as to form a closed trapezoidal cross-section. Linear portions 13 at opposite ends in the longitudinal direction of the rear frame 12 have a constant cross section, but, in order to avoid interference with a suspension spring or a hydraulic damper, an upwardly curved portion 14 is formed in a longitudinally middle section of the rear frame 12, that is, a portion on which a suspension system for a rear wheel is mounted.

In the curved portion 14, the height of side walls 12b of the rear frame 12 decreases, and a bottom wall 12c of the rear frame 12 accordingly forms a smooth upward curve. As is clearly shown in FIG. 2, the bottom wall 12c of the rear frame 12 has a pair of front and rear curvature starting points a where the flat face of the linear portions 13 shifts to the curved face of the curved portion 14, a top point b where the curved portion 14 is most deeply upwardly recessed, and a pair of front and rear inflection points c between the pair of front and rear curvature starting points a and the top point b. The inflection points c referred to herein are points where the curvature changes from positive (protruding downward) to negative (protruding upward) on the way from the curvature starting points a to the top point b.

The area around the curved portion 14 of the rear frame 12 is reinforced by an upper stiffener 15 and a lower stiffener 16.

The upper stiffener 15 is a member having a U-shaped cross-section opening upward and having a pair of side walls 15a and a bottom wall 15b providing a connection between lower ends of the side walls 15a. In a state in which the upper stiffener 15 is housed inside an upper portion of the rear frame 12, the upper stiffener 15 is welded to the rear frame 12 at welds w2 such that the side walls 15a are in contact with inner faces of the side walls 12b of the rear frame 12. Linear upper edges of the side walls 15a extend along the upper edges of the side walls 12b of the rear frame 12 throughout the length of the upper stiffener 15. On the other hand, the height of the side walls 15a of the upper stiffener 15 varies in the longitudinal direction; the bottom wall 15b curves so as to protrude upward on either side of the front and rear inflection points c, and the side walls 15a are therefore high at either end and low in the middle in these sections. Between the front and rear inflection points c (i.e., from the front inflection point forward and from the rear inflection point rearward, as illustrated), the bottom wall 15b curves so as to protrude downward, and the side walls 15a are low at each end and high in the middle.

The lower stiffener 16 is a member having a U-shaped cross-section opening upward and having a pair of side walls 16a and a bottom wall 16b providing a connection between lower ends of the side walls 16a. In a state in which the lower stiffener 16 is superimposed on an outer face of a lower part of the rear frame 12, the lower stiffener 16 is welded to the rear frame 12 at welds w3 such that the lower stiffener side walls 16a are in contact with outer faces of the rear frame side walls 12b. The lower stiffener 16 is provided in an area between the front and rear inflection points c of the rear frame 12, and the lower stiffener bottom wall 16b extends along the rear frame bottom wall 12c. On the other hand, upper edges of the lower stiffener side walls 16a extend beneath the upper edges of the rear frame 12 in parallel thereto, resulting in that the lower stiffener side walls 16a being high at each end in the longitudinal direction and low in the middle.

Figure 5:
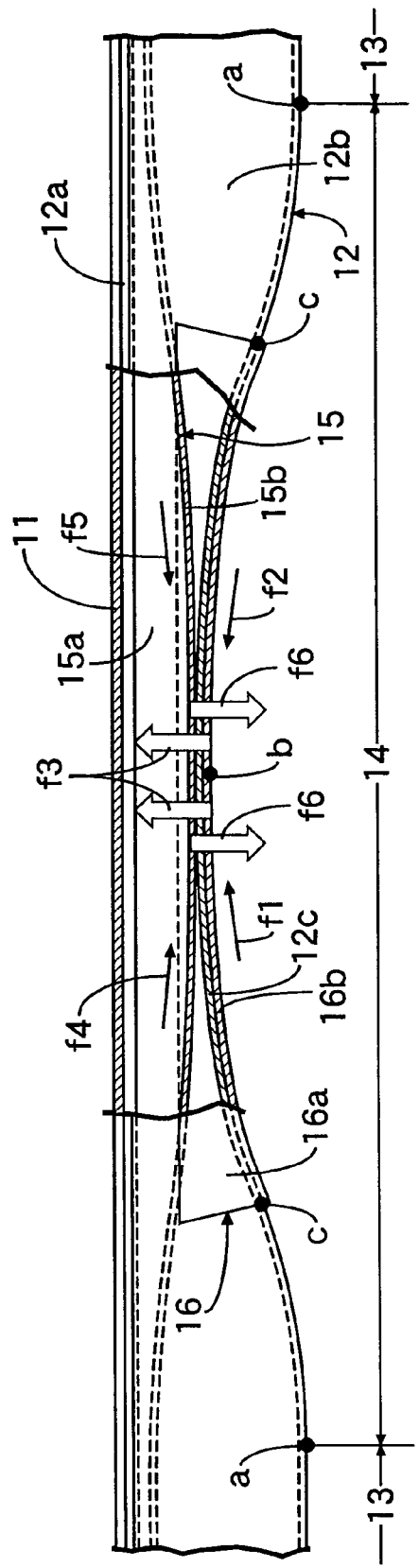

As is clear from FIG. 5, in the area of the curved portion 14 of the rear frame 12, the bottom wall 15b of the upper stiffener 15 and the bottom wall 16b of the lower stiffener 16 are arranged in an X shape relative to the top point b of the rear frame 12.

The operation of the embodiment of the present invention having the above-mentioned arrangement is now explained.

When an automobile is involved in a head-on collision or a rear-end collision, a compressive force in the longitudinal direction acts on the rear frame 12. In this case, it is desirable to absorb the impact by compressing the front and rear linear portions 13 of the rear frame 12 so as to make them buckle while minimizing deformation of the curved portion 14 of the rear frame 12.

In the curved portion 14 of the rear frame 12, since the bottom wall 12c thereof is curved upward, the height of the side walls 12b leading to the bottom wall 12c decreases to lower the strength, but by superimposing the lower stiffener 16 on the side walls 12b and fixing the lower stiffener 16 thereto, the rigidity of the curved portion 14 of the rear frame 12 where the vertical height is decreased is enhanced. However, in the event of a longitudinally oriented collision, since the bottom wall 12c of the curved portion 14 of the rear frame 12 and the bottom wall 16b of the lower stiffener 16 curve so as to protrude upward, a compressive load f1 acting thereon and a reactive force f2 oppose each other to act obliquely upward in the direction to the top point b of the curved portion 14. Therefore, a combined force f3, which include vectors or components of the compressive load f1 and the reactive force f2, acts upward and tends to urge the curved portion 14 of the rear frame 12 to bend upwardly into an inverted V shape.

However, at the same time, the compressive force in the longitudinal direction acting on the rear frame 12 compresses the upper stiffener 15. Since the bottom wall 15b of the upper stiffener 15 curves so as to protrude downward, a compressive load f4 acting thereon and a reactive force f5 oppose each other to act obliquely downward in the direction to the top point b of the curved portion 14. As a result, a combined force f6, which includes vectors or components of the compressive load f4 and the reactive force f5, acts downward to counterbalance the above-mentioned upwardly directed resultant force f3, and thereby prevents the curved portion 14 of the rear frame 12 from bending into the inverted V shape.

As described above, by merely reinforcing the curved portion 14 of the rear frame 12 for arranging a suspension system, etc. with the upper stiffener 15 and lower stiffener 16 which are lighter than plate material, it is possible to reliably suppress bending of the curved portion 14 when the automobile is involved in a collision. Accordingly, the forces are transferred to the front and rear linear portions, thereby making the front and rear linear portions 13 effectively buckle to enhance the impact absorbing effect.

Although an embodiment of the present invention has been explained above, the present invention can be modified in a variety of ways without departing from the scope and spirit thereof.

For example, in the embodiment, the rear frame 12 of the automobile has been illustrated, but the present invention is also applicable to front side frame of an automobile, a cross member of a four-wheel drive vehicle, etc.

What is claimed is:

1. A vehicle frame structure in which upper edges of a frame member having an upwardly opening U-shaped cross-section are fixed to a lower face of a substantially flat panel so as to form a closed cross-section, and the frame member has a curved portion formed in a longitudinally middle section thereof, the curved portion having an upwardly curving bottom wall,
  wherein an upper stiffener, which has an upwardly opening U-shape in cross section, is fixed to at least an inner face of an upper part of the curved portion of the frame member, and
  wherein a bottom wall of the upper stiffener and the bottom wall of the frame member are arranged in an X shape relative to a top point of the curved portion.

2. The vehicle frame structure of claim 1, wherein a lower stiffener, which has an upwardly opening U-shape in cross-section, is fixed to an outer face of a lower part of a region between two inflection points of the bottom wall of the curved portion.

3. The vehicle frame structure of claim 1, wherein the upper edges of the rear frame comprises flanges that are joined to a lower face of the substantially flat panel so as to form a closed trapezoidal cross-section.

4. The vehicle frame structure of claim 2, wherein the upper edges of the rear frame comprises flanges that are joined to a lower face of the substantially flat panel so as to form a closed trapezoidal cross-section.

5. The vehicle frame structure of claim 1, wherein the bottom wall of the upper stiffener curves so as to protrude upward outside of the two inflection points, and wherein between the two inflection points, the upper stiffener bottom wall curves so as to protrude downward, so as to strengthen the curved portion against deformation in the event of a longitudinally-directed compressive force.

6. The vehicle frame structure of claim 2, wherein the bottom wall of the upper stiffener curves so as to protrude upward outside of the two inflection points, and wherein between the two inflection points, the upper stiffener bottom wall curves so as to protrude downward, so as to strengthen the curved portion against deformation in the event of a longitudinally-directed compressive force.

7. The vehicle frame structure of claim 5, wherein the upper stiffener bottom wall extends between lower ends of a pair of upper stiffener side walls, and wherein the upper stiffener side walls have a height that varies along the length of the upper stiffener in accordance with a curvature of the upper stiffener bottom wall.

8. The vehicle frame structure of claim 6, wherein the upper stiffener bottom wall extends between lower ends of a pair of upper stiffener side walls, and wherein the upper stiffener side walls have a height that varies along the length of the upper stiffener in accordance with a curvature of the upper stiffener bottom wall.

9. The vehicle frame structure of claim 7, wherein the upper stiffener is received inside the rear frame and is joined to the rear frame such that the upper stiffener side walls are in contact with inner faces of rear frame side walls.

10. The vehicle frame structure of claim 8, wherein the upper stiffener is received inside the rear frame and is joined to the rear frame such that the upper stiffener side walls are in contact with inner faces of rear frame side walls.

11. The vehicle frame structure of claim 7, wherein the upper stiffener side walls comprise upper edges aligned with the upper edges of the rear frame side walls along the length of the upper stiffener.

12. The vehicle frame structure of claim 8, wherein the upper stiffener side walls comprise upper edges aligned with the upper edges of the rear frame side walls along the length of the upper stiffener.

13. The vehicle frame structure of claim 2, wherein the lower stiffener bottom wall extends between lower ends of a pair of lower stiffener side walls, wherein the lower stiffener enhances rigidity of the curved portion of the rear frame.

14. The vehicle frame structure of claim 13, wherein the lower stiffener is joined to the rear frame such that the lower stiffener side walls are in contact with outer faces of rear frame side walls.

15. The vehicle frame structure of claim 14, wherein the lower stiffener bottom wall extends along the rear frame bottom wall, and wherein upper edges of the lower stiffener side walls are disposed beneath the upper edges of the rear frame such that the lower stiffener side walls are high at each end in the longitudinal direction and low in a middle.

16. The vehicle frame structure of claim 1, wherein the rear frame comprises front and rear linear portions disposed on opposite sides of the curved portion that absorb impact in at least one of a head-on and rear-end collision by compressing so as to buckle while the upper stiffener and the lower stiffener cooperate to minimize deformation of the curved portion of the rear frame.

17. A method for controlling deformation of a vehicle frame structure, said vehicle frame structure including a frame member with an upwardly opening U-shape in cross section that is fixed to a lower face of a panel so as to form a closed cross-section, said frame member comprising an upwardly curved portion formed between a pair of linear portions, said method comprising the steps of:
  providing an upper stiffener and a lower stiffener;
  fixing the upper stiffener to an inner face of the curved portion of the frame member;
  fixing the lower stiffener to an outer face of the curved portion of the frame member, said lower stiffener extending over a region between two inflection points of a bottom wall of the curved portion;
  wherein the upper and lower stiffeners cooperate to resist deformation of the curved portion in the event of a longitudinally-oriented compressive force and thereby transfer such compressive force to the linear portions of the frame member.

* * * * *